United States Patent [19]

Takashima et al.

[11] Patent Number: 5,596,366
[45] Date of Patent: Jan. 21, 1997

[54] CAMERA APPARATUS HAVING CAMERA MOVEMENT DETECTION

[75] Inventors: Tsuneo Takashima, Kawasaki; Shigeru Ogino, Tokyo, both of Japan

[73] Assignee: Canon Kabushiki Kaisha, Tokyo, Japan

[21] Appl. No.: 457,751

[22] Filed: Jun. 1, 1995

Related U.S. Application Data

[63] Continuation of Ser. No. 176,512, Jan. 3, 1994, abandoned, which is a continuation of Ser. No. 698,143, May 10, 1991, abandoned.

[30] Foreign Application Priority Data

May 14, 1990 [JP] Japan ................................ 2-123564
May 16, 1990 [JP] Japan ................................ 2-124100

[51] Int. Cl.[6] .................................................. H04N 5/228
[52] U.S. Cl. .................................... 348/208; 348/372
[58] Field of Search ..................................... 348/207, 208, 348/372, 373, 374, 375, 376; 358/335, 906; 354/70, 484; 250/208.1; H04N 5/228, 5/225

[56] References Cited

U.S. PATENT DOCUMENTS

| | | | |
|---|---|---|---|
| 4,453,812 | 6/1984 | Suzuki et al. | 354/484 |
| 4,998,809 | 3/1991 | Tsuji et al. | 359/554 |
| 5,012,270 | 4/1991 | Sekine et al. | 354/430 |
| 5,053,804 | 10/1991 | Odaka et al. | 354/484 |
| 5,138,354 | 8/1992 | Odaka et al. | 354/400 |
| 5,175,580 | 12/1992 | Shiomi | 354/410 |

FOREIGN PATENT DOCUMENTS

| | | | |
|---|---|---|---|
| 62-08669 | 1/1987 | Japan | H04N 5/228 |
| 1-86766 | 3/1989 | Japan | H04N 5/232 |
| 63209070 | 2/1990 | Japan | G03B 17/00 |

Primary Examiner—Michael Lee
Assistant Examiner—Tuan V. Ho
Attorney, Agent, or Firm—Fitzpatrick, Cella, Harper & Scinto

[57] ABSTRACT

A camera having camera movement detection includes a movement detection circuit for detecting the movement of the camera and a blur correction circuit for correcting the blur of a picture image due to the movement of the camera on the basis of the output of the movement detection circuit. A control circuit controls the power supply of the camera on the basis of the output of the movement detection circuit and turns off the power supply of the blur correction circuit in a case where the camera is fixed.

35 Claims, 7 Drawing Sheets

CAMERA APPARATUS HAVING CAMERA MOVEMENT DETECTION

This application is a continuation of application Ser. No. 08/176,512 filed Jan. 3, 1994, which is a continuation of Ser. No. 07/698,143, filed May 10, 1991, both now abandoned.

BACKGROUND OF THE INVENTION

1. Field of the Invention

The present invention relates to a camera apparatus and more particularly to a camera apparatus which records video signals of photographs on a recording medium, such as a magnetic tape.

2. Description of the Related Art

In a camera apparatus having the video recording function described above, for example, a camera-integral type VTR (Video Tape Recorder), wasteful power consumption is a major problem which needs to be solved. For example, when an operating state (standby mode) in which photographing or recording is not performed even if power is turned on continues for a preset amount of time, a function of automatically shutting off the power has been proposed.

In a conventional camera-integral type VTR, however, in a case where the VTR is put into a recording mode and an operation for shutting off the power or changing to a standby mode is forgotten, the VTR has drawbacks in that, unwanted recording continues and the power is wastefully consumed since a means for detecting this state is not provided.

In the camera apparatus field, the automation of camera apparatus, such as still cameras and video cameras, has advanced in recent years. A camera apparatus equipped with an automatic exposure function, an automatic focusing adjustment function, or the like has been put into wide practical use. Several techniques to realize a vibration-proof function for preventing image blurs caused by the movement of the whole apparatus have been proposed. A camera apparatus having a vibration-proof function is generally comprised of a movement detection means for detecting the movement of the whole apparatus, an image blur correction means for correcting image blurs caused by said movement, a drive means for driving the image blur correction means, and a control means for computing the amount of correction according to the output of the movement detection means to control the drive means. The abovementioned detection means includes an angular accelerometer and an angular displacement gauge. The above-mentioned image blur correction means includes a lens eccentricity correction optical system and a variable apical angle prism, as disclosed in Japanese Patent Laid-Open No. 63-209070.

In an apparatus constructed as described above, however, power is wastefully consumed because an electric current is supplied to a drive means continuously in spite of the fact that a vibration-proof operation is unnecessary in a case where photographing is performed by the apparatus, for example, when it is fixed to a tripod, or placed on a table, a stand, etc, even during photographing. The above-mentioned drive means generally consumes a relatively large amount of current. This hinders any intention of using the camera apparatus for a long period of time by using the limited power of battery cells, battery packs, etc.

SUMMARY OF THE INVENTION

The present invention has been devised to solve the above-mentioned problems. A first object of the present invention is to prevent a wasteful consumption of power by camera apparatuses, such as still cameras and video cameras.

A second object of the present invention is to provide a camera apparatus which prevents power from being consumed wastefully as a result of a continuous recording operation by a method in which, in a case where an operation for shutting off the power or changing to a standby mode is forgotten when recording is terminated, this state is detected, and the recording mode is released or the power is turned off.

A third object of the present invention is to provide a camera apparatus which is capable of detecting the ambient environment of the camera apparatus being carried around, such as the termination of a recording operation, by means of a detection means and correcting the operating mode thereof.

A fourth object of the present invention is to provide a camera apparatus which is capable of reducing power consumption as a whole by saving power consumption by making the apparatus automatically shift to an operating state, in which power consumption is low, in a case where a movement in a non-photographing state exists.

A fifth object of the present invention is to provide a camera apparatus which is capable of reducing power consumption by automatically changing to a lower power consumption mode or to a power shut-off mode in a case where an operation for shutting off the power or changing to a standby mode is forgotten in a state where the apparatus is placed in a recording state.

To this end, according to the present invention, there is provided a camera apparatus that takes a photograph of an object and records it on a recording medium, or outputs signals capable of being recorded on a recording medium, comprising: a movement detection means for detecting the movement of the above camera apparatus; and a control means for monitoring the output of the movement detection means and for making the apparatus shift to an operating state in which power consumption is low when the output becomes a predetermined value.

A sixth object of the present invention is to provide a camera apparatus having a vibration-proof function which is capable of suppressing wasteful power consumption.

A seventh object of the present invention is to provide a blur correction apparatus in which power consumption is reduced by stopping the driving of the blur correction means when it is judged that a vibration-proof operation is unnecessary when the movement of a camera apparatus is below a predetermined level for a preset amount of time.

An eighth object of the present invention is to provide a camera apparatus comprising: a determination means that monitors the output of a movement detection means to determine whether or not the apparatus is in a fixed state; and a control means for computing the amount of a blur correction according to the output of the movement detection means to control the drive means and for stopping the driving of the drive means when it is determined by the determination means that the apparatus is fixed, in which apparatus wasteful power consumption is prevented by stopping the driving of the drive means when it is judged that a vibration-proof operation is unnecessary when the camera apparatus is fixed.

To this end, according to the present invention, there is provided a camera apparatus comprising: a determination means that monitors the output of a movement detection means to determine whether or not the apparatus is in a fixed state; and a control means for computing the amount of a blur correction according to the output of the movement detection means to control the drive means and for stopping the driving of the drive means when it is determined by the determination means that the apparatus is fixed, in which apparatus wasteful power consumption is prevented by stopping the driving of the drive means when it is judged that a vibration-proof operation is unnecessary when the camera apparatus is fixed.

According to a further aspect of the present invention, a camera apparatus comprises photographing means for photographing an object, recording means for recording picture images photographed by said photographing means, and movement detection means for detecting a movement of said photographing means and for outputting a signal proportional to the detected movement. Control means are provided for controlling the recording means on the basis of the output of the movement detection means, and for stopping the operation of the recording means when the output of said movement detection means exceeds a predetermined level for a predetermined amount of time.

According to a further aspect of the present invention, a camera apparatus comprises photographing means for receiving a picture image and for outputting electrical picture image signals corresponding to the received picture image. Movement detection means are provided for detecting movement of said camera apparatus. Control means are provided for sampling the output of the movement detection means at a predetermined cycle, and for stopping at least a part of an operation of said camera apparatus when a number of times in which the output of said movement detection means is outside of a predetermined range within a predetermined amount of time reaches a predetermined number of times.

According to yet a further aspect of the present invention, a camera apparatus having a vibration-proof function comprises movement detection means for detecting a movement of said camera apparatus, and image blur correction means for correcting an image blur caused by said movement. Driving means are provided for driving the image blur correction means, and determination means are included for monitoring an output of said movement detection means, and for determining whether or not said apparatus is in a fixed state. Control means are provided for computing an amount of a movement correction on the basis of the output of said movement detection means in order to control said driving means, and for stopping the driving of said driving means when it is determined by said determination means that the apparatus is in a fixed state.

These and other objects, features and advantages of the present invention will become clear when reference is made to the following description of the preferred embodiments of the present invention, and to the accompanying drawings.

DESCRIPTION OF THE PREFERRED EMBODIMENTS

Various embodiments of the present invention will be explained hereinbelow with reference to the accompanying drawings.

Figure 1:
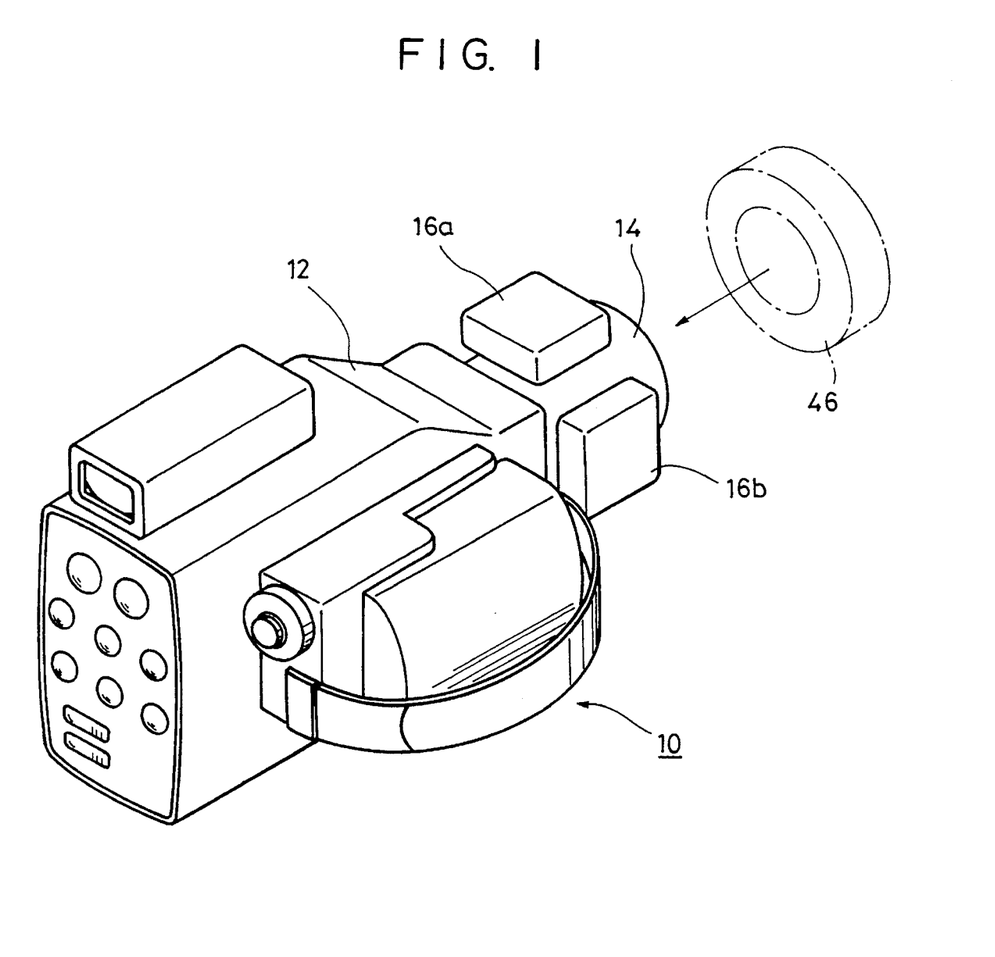
FIG. 1 is a perspective view of the exterior of an embodiment of a camera apparatus of the present invention.

FIG. 1 is a perspective view of the exterior of an embodiment of the present invention. Reference numeral 10 denotes a camera-integral type VTR of the present invention, 12 denotes the main body thereof, and 14 denotes a photographing lens barrel installed in front of the main body 12. Movement detectors 16a and 16b for respectively detecting movements in upward and downward directions, and in right and left directions, are fixed on the top and on the side of the lens barrel 14, respectively. The movement detectors 16a and 16b output a movement detection signal proportional to the amount of the detected movement.

Figure 2A:
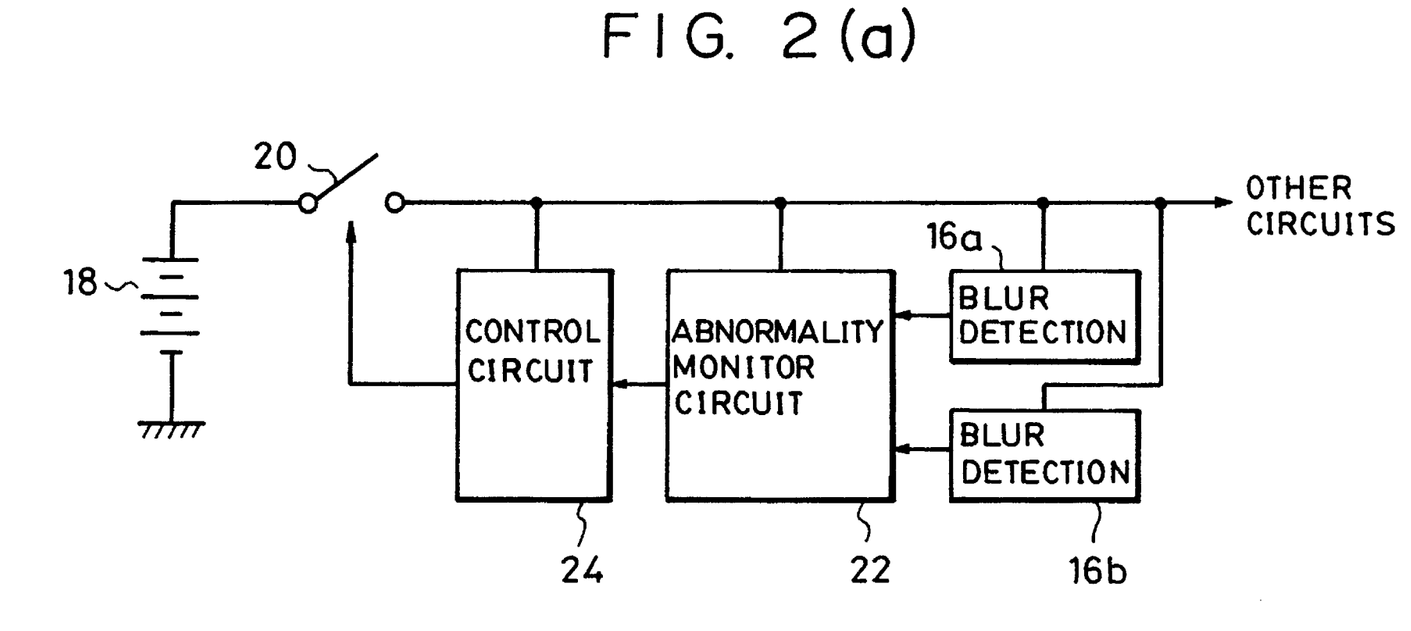
FIGS. 2(a) and 2(b) are each a block diagram of the construction of the electrical circuit of the embodiment.

FIG. 2(a) is a block diagram of an electrical circuit of the embodiment. Reference numeral 18 denotes a power-supply battery cell, 20 denotes a power-supply switch, 22 denotes an abnormality monitor circuit for monitoring the occurrence of abnormal movements by receiving the output of the movement detectors 16a and 16b, and 24 denotes a control circuit for opening the power-supply switch 20 according to an abnormality detection signal from the abnormality monitor circuit 22. A required power-supply voltage is supplied to the movement detectors 16a and 16b, the abnormality monitor circuit 22, and the control circuit 24 by way of the power-supply switch 20. Of course, a required power-supply voltage is also supplied to photographing circuits and recording circuits from the power-supply battery cell 18 by way of the power-supply switch 20.

Figure 3:
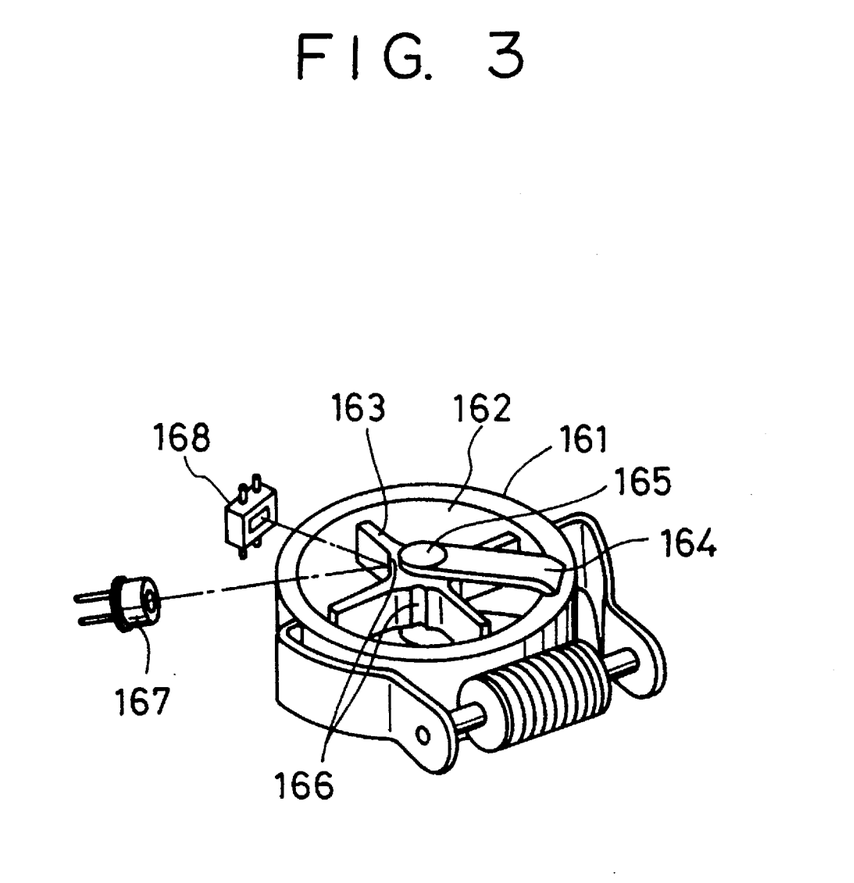
FIG. 3 is a perspective view of the internal construction of movement detectors 16a and 16b shown in FIG. 1.

FIG. 3 is a perspective view of the internal construction of movement detectors 16a and 16b. Reference numeral 161 denotes a cylindrical outer casing, in the inside of which is filled a liquid 162 having a high specific gravity. A plurality of sensing blades 163 rotatably supported by a shaft 165 positioned in the central shaft line position of the outer casing 161 by means of supporting arms are disposed in the liquid. A reflection surface 166 in the form of a slit is provided among the adjacent blades 163 in the base section of the sensing blades 163. Reference numeral 167 denotes a light-emitting device, and 168 denotes a light-receiving device. The light-emitting device 167 and the light-receiving device 168 are placed in positions such that the output light of the light-emitting device 167 reflected on the reflection surface 166 enters the light-receiving device 168. A light-emitting device 167 is, for example, an infrared light-emitting diode. A light-receiving device 168 is, for example, a photoelectric conversion element, such as a PSD (Photo-Sensitive Detector), whose output varies depending on the spot position of a light flux received. The output of the light-receiving device 168 becomes the output of respective movement detectors 16a and 16b.

Next, a description will be provided of the operation of the movement detectors 16a and 16b. In a case where the entire apparatus moves due to the movement of the operator's hands holding the apparatus 10, the outer casing 161 in the inside of the movement detectors 16a and 16b, a support arm 164, the light-emitting device 167, and the light-receiving device 168 move together with the main body 12. However, the liquid 162 having a high specific gravity in the inside thereof, hence, the sensing blades 163 and the reflection surface 166, try by their own inertia to be stationary in relation to the absolute coordinates. As a result, a relative angle is created whose side is proportional to the amount of the movement between the outer casing 161 and the sensing blades 163. The output light of the light-emitting device 167 is reflected on the reflection surface 166, and the position of a spot formed on the light-receiving surface of the light-receiving device 168 varies according to the relative angle. The light-emitting device 167 outputs a signal whose size is proportional to the amount of the spot position changes. That is, the light-receiving devices 168 outputs a signal indicating the size of a movement in a predetermined direction. In this way, signals indicating the size of movements in the vertical and horizontal directions are output from the movement detectors 16a and 16b, respectively.

Figure 4:
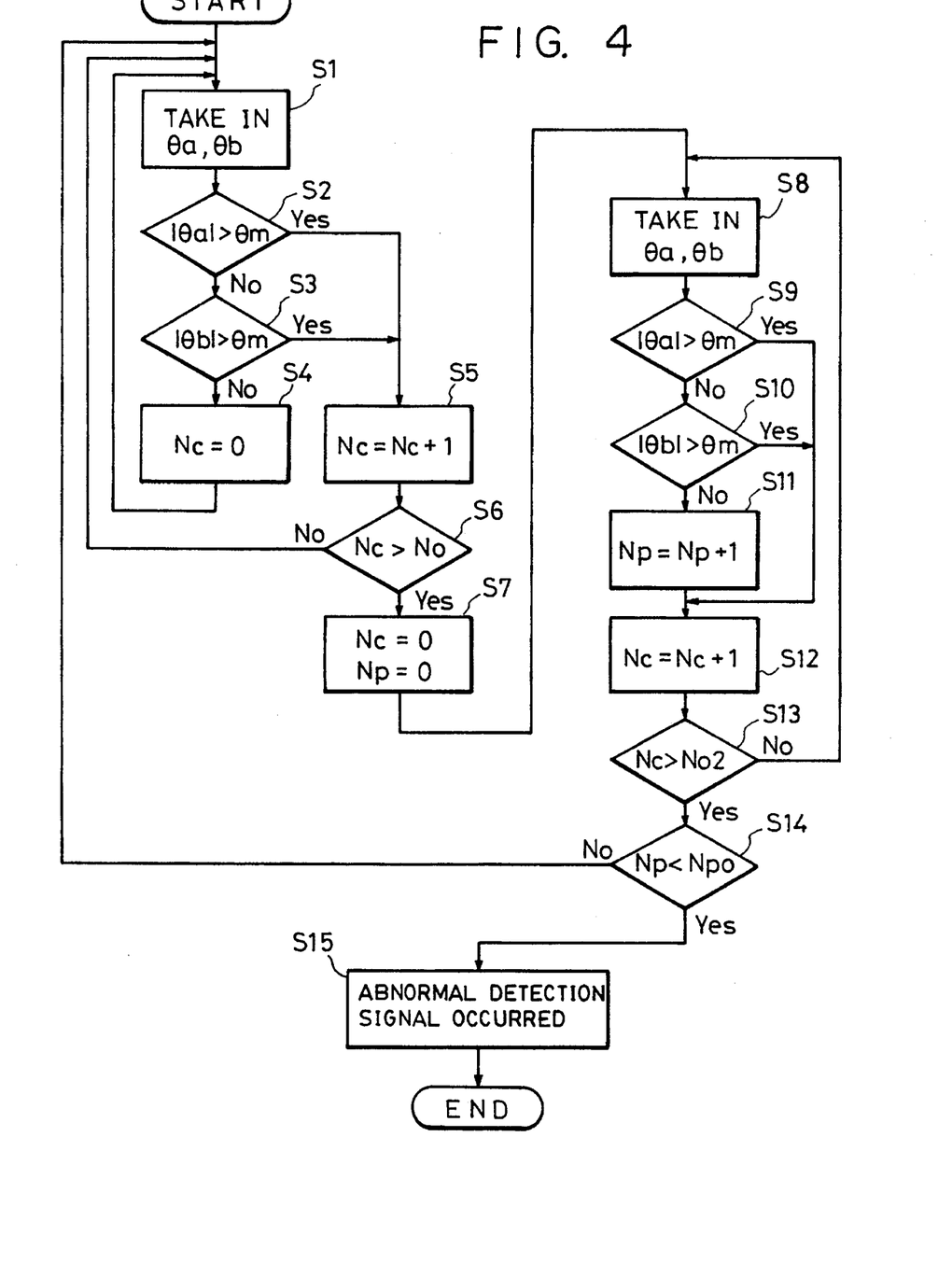
FIG. 4 is a flowchart of the operation of an abnormality monitor circuit 22 of FIG. 2.

Next, the operation of the abnormality monitor circuit 22 will be explained with reference to the flowchart in FIG. 4. The outputs of the movement detectors 16a and 16b are denoted as θa and θb, respectively. The abnormality monitor circuit 22 is activated at the same time the power-supply switch 20 is closed, and takes in the outputs θa and θb of the movement detectors 16a and 16b at every predetermined very small sampling time interval. It is checked whether or not the absolute values of the taken-in signals θa and θb are greater than a predetermined value θm (S2, S3). When both values are equal to or smaller than θm (S3), the outputs of the movement detectors 16a and 16b are judged to be both correct. Hence, a time counter $N_c$ is cleared (S4), and the process returns to S1. When either |θa| or |θb|, or both, is/are greater than θm (S2, S3), the time counter $N_c$ is incremented (S5), and $N_c$ is then compared with a predetermined value $N_o$ (S6). When the time counter $N_c$ is equal to or smaller than the predetermined value $N_o$, whether the outputs of the movement detectors 16a and 16b are abnormal cannot be decided yet, and the process returns to S1. When the time counter $N_c$ is greater than the predetermined value $N_o$, it is judged that the outputs of the movement detectors 16a and 16b might be abnormal. The time counter $N_c$ and a status counter $N_p$ are then cleared to zero (S7), and the process proceeds to an abnormality monitor mode in S8 or thereafter.

In the abnormality monitor mode, the outputs of the movement detectors 16a and 16b are taken in at every predetermined very small sampling time interval in the same way as in S1. It is then checked whether or not |θa| and |θb| are greater than θm in the same manner as in S2 and S3 (S9, S10). If both of them are equal to or smaller than θm, it is judged that the apparatus is normal in both the vertical and horizontal directions. Next, $N_p$ is incremented (S11), and then $N_c$ is incremented (S12). When |θa| or/and |θb| is/are greater than θm, it can be judged that an abnormality exists in a vertical or/and horizontal direction(s). The time counter $N_c$ is then incremented (S12). S8 to S12 are then repeated until $N_c$ becomes greater than a predetermined value $N_{o2}$ (S13). If $N_c$ becomes greater than the predetermined value $N_{o2}$, $N_p$ is compared with a predetermined value $N_{po}$ (S14). If $N_p$ is greater than the predetermined value $N_{po}$, it is judged that the outputs of the movement detectors 16a and 16b are normal. The abnormality monitor mode is then released, and the process returns to S1. If $N_p$ is smaller than the predetermined value $N_{po}$, it is judged that the outputs of the movement detectors 16a and 16b are abnormal. An abnormality detection signal is then generated and the control circuit 24 is notified about the occurrence of an abnormality, and the process ends (S15). The control circuit 24 opens, for example, the switch 20 in response to this abnormality detection signal, thereby causing the power supply of the apparatus to be turned off.

In a case where photographing (i.e., recording) is not performed and the apparatus 10 is being carried around by a person, at least one of the absolute values |θa| and |θb| of the outputs of the movement detectors 16a and 16b becomes a large value for a certain period of time, and it can then be decided that recording is not needed. The outputs θa and θb of the movement detectors 16a and 16b are then monitored for a certain time period. In a case where the occupancy ratio of the time period is quite small in which period both of the outputs "θa| and |θb| are within a correct range during a monitor time period, it can be decided that recording is not needed. Therefore, by taking these conditions into consideration, an abnormality detection signal is generated.

Although the abnormality monitor circuit 22 is activated by turning on the power supply according to the above explanation, the abnormality monitor circuit 22 may be put into an operating state at the time of switching to a recording mode or at the time the recording mode is continued.

An apparatus having an image blur correction optical system 46, as shown by a long and short dash line in FIG. 1, installed in front of the photographing lens barrel 14 so that, when the apparatus is slightly moved due to the movement of the operator's hands, such movement is cancelled by the image blur correction optical system 46, is already known. As regards the image blur correction optical system 46, an arrangement is known in which a lens eccentricity correction optical system and a variable apical angle prism capable of changing an apical angle are used. For example, in an arrangement in which a variable apical angle prism is used, the apical angle of the variable apical angle prism is controlled so as to cancel a blur amount which is proportional to the amount of a movement detected by a movement detector.

In a camera apparatus using such an image blur correction optical system 46, the outputs of the movement detectors 16a and 16b can also be used for controlling the image blur correction optical system 46. In other words, in a camera apparatus using an image blur correction optical system, the output (of a movement detector) for controlling the image blur correction optical system may be connected to the abnormality monitor circuit 22 constructed as shown in FIG. 3, so that when an abnormality is detected in the output of the movement detector, the power supply is shut off.

Figure 2B:
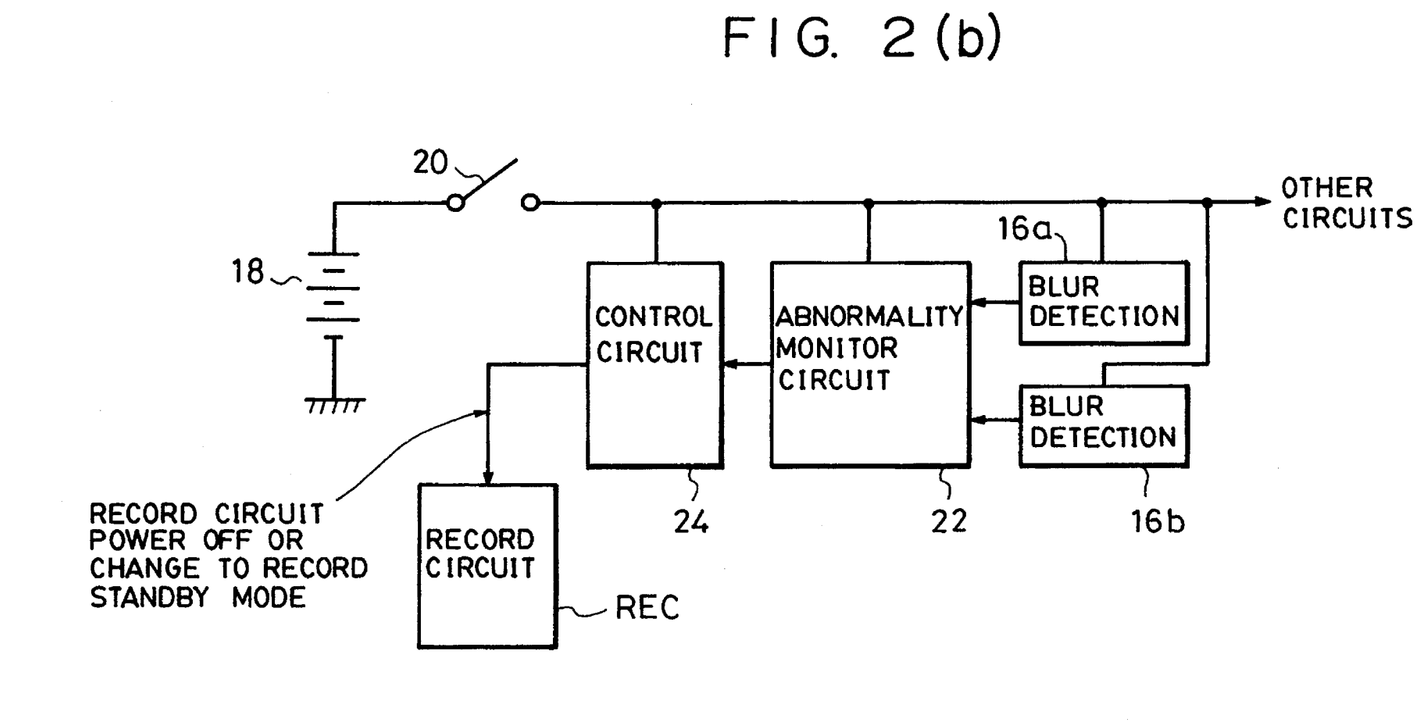

In the above embodiment, in a case where a movement of a predetermined level continues for a predetermined amount of time, it is judged that photographing (and recording) is not being performed, and the power supply is shut off. Needless to say, as shown in FIG. 2(b), if a recording circuit REC is set to a standby mode, the power supply of the recording circuit is turned off, or may be automatically switched to a lower power consumption mode, such as a mode (a so-called sleep mode) in which power is supplied to only a minimum key operation detection circuit.

As can be easily understood from the above explanation, according to the present invention, power consumption can be reduced since a camera apparatus can be automatically switched to a lower power consumption mode or a power shutoff state in a case where an operation for shutting off the power or changing to a standby mode is forgotten in a state where the apparatus is placed in a recording state.

According to the above-described embodiment, a camera apparatus is disclosed, in which the power supply of the camera apparatus is turned off to reduce power consumption when the movement detection output of a movement detector is above a predetermined level and continues over a preset amount of time, because it is assumed that the camera apparatus is being carried around in a state in which the operator has forgotten to turn off a recording switch or the like. According to an embodiment described below which achieves the above-mentioned sixth to eighth objects of the present invention particularly, there is provided a camera apparatus in which a low power consumption is achieved by controlling the operating/non-operating status of the above movement correction apparatus according to the amount of movement detected by a movement detector and by saving the power consumption of a movement detection and correction system itself.

The second embodiment will now be explained hereinbelow in detail with reference to FIGS. 5 and 6.

Figure 5:
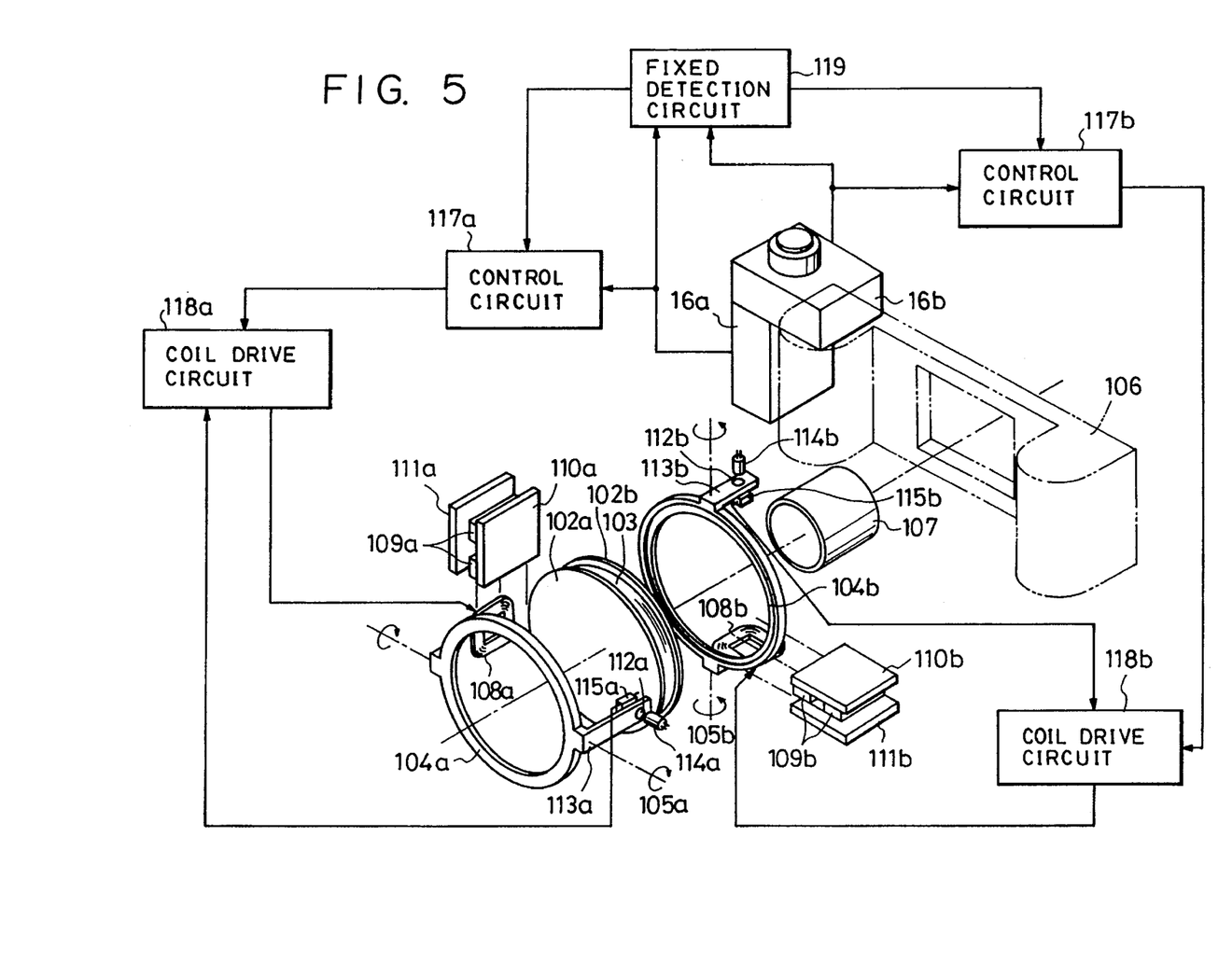
FIG. 5 shows the mechanical construction of the main portions of a camera apparatus main body having a vibration-proof function and an electrical block diagram of a second embodiment of the present invention.

FIG. 5 shows the second embodiment of the present invention. In FIG. 5, reference numerals 102a and 102b denote two opposing transparent plates. A liquid (not shown) having a high refractivity is filled in the space enclosed by the plates and a transparent film 103 which seals the outer circumference of the plates. A variable apical angle prism is formed by the above configuration. The variable apical angle prism is grasped by frame bodies 104a and 104b and each transparent plate is held so as to be rotatable about shafts 105a and 105b. Reference numeral 106 denotes a camera apparatus main body, and 107 denotes a photographing lens barrel. The above-mentioned variable apical angle prism is positioned in front of the lens barrel.

Flat coils 108a and 108b are fixed to the ends of the frame bodies 104a and 104b. Permanent magnets 109a and 109b and yokes 110a, 110b, 111a, and 111b are positioned in such a manner as to be opposed on both sides of flat coils 108a and 108b, thus forming a closed magnetic circuit. Arms 113a and 113b having slits 112a and 112b are placed in a symmetrical position about the coils 108a and 108b of the frame bodies 104a and 104b. Light-emitting devices 114a and 114b and light-receiving devices 115a and 115b are positioned so as to oppose each other on both sides of slits 112a and 112b. A light flux emitted from the light-emitting devices 114a and 114b is made to enter the light-receiving devices 115a and 115b after it passes through slits 112a and 112b. The light-emitting devices 114a and 114b are, for example, infrared light-emitting devices, such as IREDs. The light-receiving devices 115a and 115b are, for example, photoelectric conversion elements, such as PSDs, whose output varies depending on the position of a received light flux spot. Reference numerals 16a and 16b each denote a movement detector which is the same as described above, which outputs a signal proportional to the amount of the movement of the camera apparatus main body 106.

Reference numerals 117a and 117b each denote a control circuit which computes (as will be described later) the amount of correction in proportion to the output values of the movement detectors 16a and 16b and outputs the difference between that value and each of the values output from the above light-receiving devices 115a and 115b. Reference numerals 118a and 118b each denote a coil drive circuit which supplies an electric current in response to a control signal output from the control circuits 117a and 117b to the coil drive, circuits 118a and 118b, causing them to generate a driving force for changing the apical angle of a variable apical angle prism. Reference numeral 119 denotes a fixation detection circuit which monitors the output of the movement detectors 16a and 16b and, when it is judged that the camera apparatus main body 106 is fixed to a tripod, a stand, etc., outputs a signal indicating the same to the control circuits 117a and 117b.

All of these components are activated by turning on a vibration-proof activation switch (not shown) mounted on the camera apparatus main body 106 and their operations are terminated by turning off the switch.

The internal components of the above movement detectors 16a and 16b are the same as those in FIG. 2, and an explanation thereof is omitted here.

In a case where the entire apparatus moves due to the movement of the user's hands holding the apparatus 106, the outer casing 161 in the inside of the movement detectors 16a and 16b, a support arm 164, the light-emitting device 167, and the light-receiving devices 168 move together with the camera apparatus main body 106. However, a liquid 162 having a high specific gravity in the inside thereof, the sensing blades 163 and the reflection surface 166 disposed in the center thereof, through their own inertia attempt to remain stationary in relation to the absolute coordinates. For this reason, a relative angle is created whose side is proportional to the amount of the movement between the outer casing 161 and the sensing blades 163. The light flux emitted from the light-emitting device 167 and reflected on the reflection surface 166 appears as a spot position change, which spot is formed on the light-receiving surface of the photoreceptor 168. A signal proportional to the amount of the change is output from the photoreceptor 168. Therefore, the output of the photoreceptor 168, i.e., each of the outputs of the movement detectors 16a and 16b, becomes a value indicating the size of the movement about the shafts 105a and 105b, respectively. This output is input to the control circuits 117a and 117b where the output is multiplied by an appropriate multiplier and the size of the apical angle of a variable apical angle prism required to remove this movement is computed.

On the other hand, variations in the rotational angle about the shafts 105a and 105b of opposing flat plates 102a and 102b, i.e., in the apical angle of the variable apical angle prism in the vertical and horizontal directions, appear as spot position changes, which spots are formed on the light-receiving surface when a light flux emitted from the light-emitting devices 114a and 114b passes through slits 112a and 112b mounted on the arms 113a and 113b of the frame bodies 104a, and 104b which rotate together with the variable apical angle prism and are made to enter the light-receiving devices 115a and 115b. As a result, the amount of the movement of the spot, i.e., information in proportion to the size of the apical angle of the variable apical angle prism, is transmitted to the control circuits 117a and 117b from the light-receiving devices 115a and 115b. The control circuits 117a and 117b compute a difference between the size of the above-mentioned computed apical angle and the size of the apical angle at the present time, i.e., the output value of the light-receiving devices 115a and 115b, and output this difference to the coil drive circuits 118a and 118b as a coil driving instruction signal. Then, the coil drive circuits 118a and 118b supply a driving current in response to the coil driving instruction signal, causing a coil driving force to be generated. The variable apical angle prism rotates about the shafts 105a and 105b by means of this coil driving force and changes its form so as to match the size of the above-mentioned computed apical angle. That is, the variable apical angle prism is arranged to perform movement correction control by feedback control in which the value of an apical angle computed to correct movement is used as a reference signal and the value of the current apical angle is used as a feedback signal.

Next, a description will be provided of the operation of the camera apparatus main body 106 when it is fixed to a tripod or the like.

Figure 6:
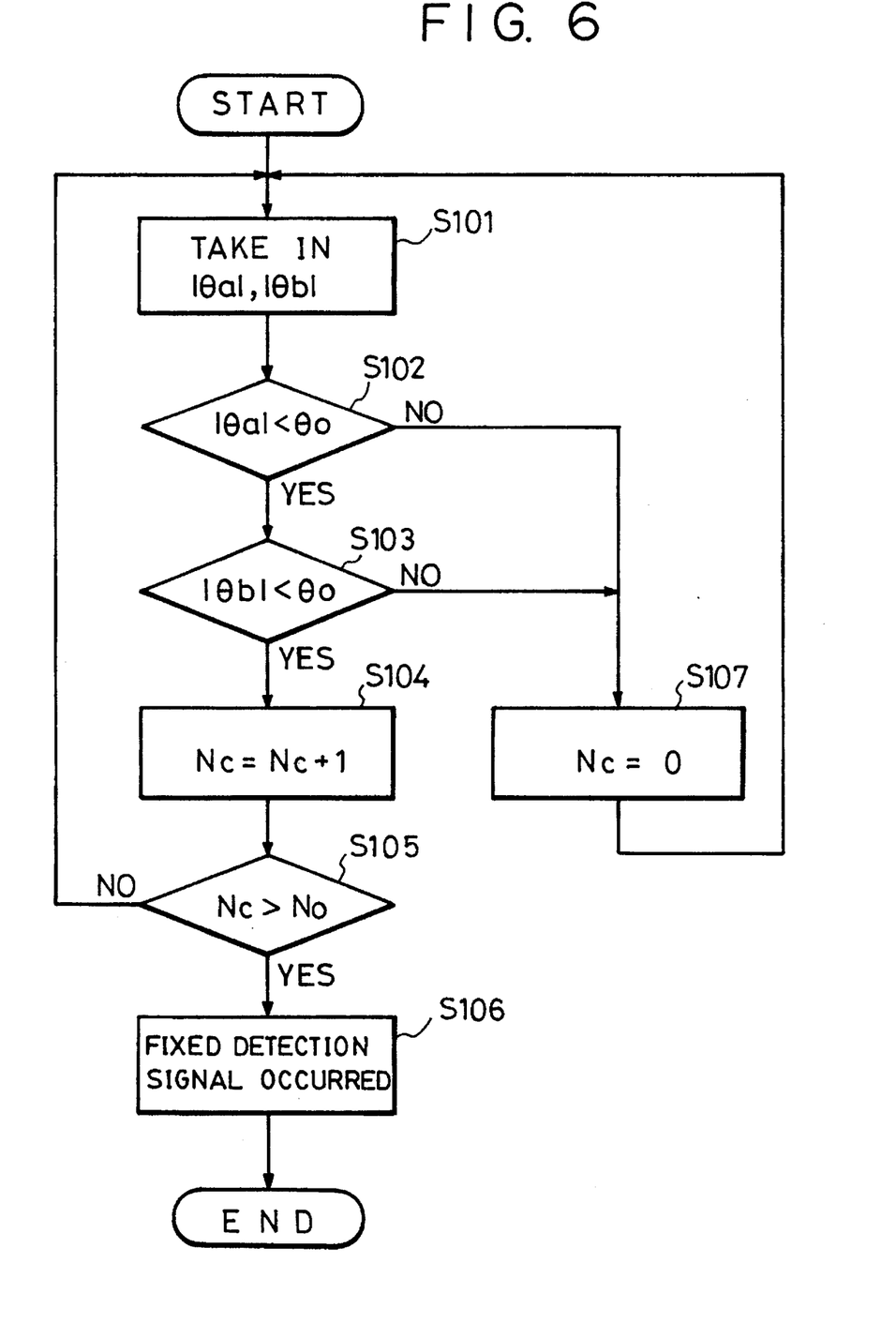
FIG. 6 is a flowchart showing the operations of a fixation detection circuit shown in FIG. 5.

FIG. 6 is a flowchart showing the sequence of control of fixation detection by means of the fixation detection circuit 119.

Outputs of the movement detectors 16a and 16b are respectively input to the control circuits 117a and 117b, as well as to the fixation detection circuit 119. The fixation detection circuit 119 is activated when the above-mentioned vibration-proof activation switch is turned on, and the operations beginning with step 101 and thereafter are started.

[Step S101] The value of the absolute value |θa| of the output of the movement detector 16a and the value of the absolute value |θb| of the output of the movement detector 16b are sampled and written in memory at every predetermined very small sampling time interval.

[Step S102] The absolute value |θa| of the output of the movement detector 16a is compared with a predetermined very small value $θ_o$. When the value of |θa| is greater than $θ_o$, it is judged that the camera apparatus main body is not fixed, and the process proceeds to step S107; when the value of a |θa| is smaller than $θ_0$, the process proceeds to step S103.

[Step S103] The absolute value |θb| of the output of the movement detector 16b is compared with a predetermined very small value $θ_o$. When the value of |θb| is greater than $θ_o$, it is judged that the camera apparatus main body is not fixed in the same manner as described above, and the process proceeds to step S107; when the value of |θa| is smaller than $θ_o$, the process proceeds to step S104.

[Step S104] In this step, "1" is added to the value of the time counter $N_c$, and the process proceeds to step S105.

[Step S105] The value of the time counter $N_c$ is compared with a predetermined value $N_o$. When the value of the $N_c$ is equal to or smaller than $N_o$, it is judged that it cannot be decided yet that the camera apparatus main body 106 is fixed, and the process returns to step S101 where it waits for data input. Thereafter, when the value of the $N_c$ becomes greater than $N_o$, it is judged that the camera apparatus main body 106 is fixed, and the process proceeds to step S106.

[Step S106] A fixation detection signal is output to the control circuits 117a and 117b, and the series of operations are terminated.

In a case where it is judged in the above step S102 or S103 that the value of |θa| is greater than $θ_o$, the process proceeds to step S107, as described above.

[Step S107] In this step, the value of the time counter $N_c$ is cleared to "0", and the process returns to step S101.

As described above, in a case where the camera apparatus main body 106 is fixed to a tripod, a desk, or a stand, the outputs of the movement detectors 16a and 16b are continually substantially zero. As a consequence, this state can be detected by the fixation detection circuit 119, and a fixation detection signal can be output to the control circuits 117a and 117b. The control circuits 117a and 117b which receive this fixation detection signal stop the operations of the coil drive circuits 118a and 118b when the fixation detection signal is received, thus ceasing the supply of an electric current to the coils 108a and 108b.

According to the present embodiment, in a case where the value of |θa| is equal to or smaller than $θ_o$ for a preset amount of time, it is judged that the camera apparatus main body 106 is fixed to a tripod or the like and therefore no image blur will occur as a result of the movement of the camera apparatus main body 106, and a vibration-proof operation is automatically stopped. As a result, no electric current is wastefully consumed. That is, low current consumption by the camera apparatus main body 106 can be achieved.

As has been explained above, according to the present invention, the output of the movement detection means is monitored. The present invention comprises a determination means for determining whether or not the apparatus is fixed and a control means for controlling a driving means by computing the amount of a movement correction in response to the output of the movement detection means and for stopping the driving of the driving means in a case where it is determined by the determination means that the apparatus is fixed. Thus, in a case where the apparatus is fixed, it is judged that a vibration-proof operation is not needed, and the driving of the driving means is stopped. Therefore, no electric current is wastefully consumed.

The individual components shown in outline or designated by blocks in the Drawings are all well-known in the camera apparatus arts and their specific construction and operation are not critical to the operation or best mode for carrying out the invention.

Many different embodiments of the present invention can be made without departing from the spirit and scope thereof; therefore, it is to be understood that this invention is not limited to the specific embodiments described above and is solely defined in the appended claims.

What is claimed is:

1. A camera apparatus, comprising:

a camera body;

movement detection means, disposed in the camera body, for detecting a relative movement between said camera body and an object, and for outputting an output signal according to the movement detected by said movement detection means;

compensating means for compensating a movement of an object image caused by the relative movement of the object and the camera body based on the output signal output by said movement detection means; and control means for controlling a camera power supply state of said camera body on the basis of the output signal of said movement detection means to shift the power supply state of said camera body to a low power supplying state when a period of time in which the output signal of said movement detection means is outside of a predetermined range exceeds a predetermined period of time.

2. A camera apparatus according to claim 1, wherein said low power supplying state comprises a power-supply off state.

3. A camera apparatus according to claim 1, wherein said control means turns off a power supply of said camera apparatus when an amount of the detected movement becomes greater than a predetermined value on the basis of the output of said movement detection means.

4. A camera apparatus according to claim 1, wherein said control means includes an abnormality detection circuit for monitoring the output of the movement detection means for a predetermined amount of time in order to detect an abnormality on the basis of a ratio of a time period in which the output of the movement detection means is greater than a predetermined value to a time period in which the output of the movement detection means is smaller than the predetermined value, and for outputting an abnormality signal indicating that recording is not needed.

5. A camera apparatus according to claim 4, wherein said control means turns off a power supply of said camera apparatus on the basis of said abnormality signal.

6. A camera apparatus according to claim 4, wherein said control means comprises a picture image recording means for recording photographed picture images, and wherein said control means releases a recording mode of said picture image recording means on the basis of said abnormality signal and sets a mode to a recording standby mode.

7. A camera apparatus according to claim 1, further comprising blur correction means for correcting a blur of a picture image due to the movement of said camera apparatus on the basis of the output signal of said movement detection means.

8. A camera apparatus according to claim 7, wherein said blur correction means comprises a variable apical angle prism adapted to be mounted in front of a photographing lens of said camera apparatus.

9. A camera apparatus according to claim 1, wherein said movement detection means comprises a plurality of sensors including a horizontal sensor for detecting a movement in a vertical direction and a vertical sensor for detecting a movement in a horizontal direction.

10. A camera apparatus, comprising:
a camera for photographing an object and recording an image of the object on a recording medium;
movement detection means, coupled to said camera, for detecting a relative movement between said camera and the object, and for outputting an output signal according to the relative movement detected by said movement detection means;
compensating means for compensating for a movement of an image received by said camera corresponding to the relative movement of the camera and the object on the basis of the output signal outputted from said movement detection means; and
control means for controlling a camera power supplying state of said camera on the basis of the output signal output from said movement detection means so as to stop the recording operation of said camera in the case that the output signal output from said movement detection means exceeds a predetermined level.

11. A camera apparatus according to claim 10, wherein said movement detection means includes a plurality of sensors capable of detecting movement at least in the vertical and horizontal directions.

12. A camera apparatus according to claim 10, wherein said control means sets said camera to a standby mode when the output of said movement detection means exceeds the predetermined level for the predetermined amount of time.

13. A camera apparatus according to claim 10, wherein said control means turns off a power supply of said camera when the output of said movement detection means exceeds the predetermined level for the predetermined amount of time.

14. A camera apparatus, comprising:
image receiving means for receiving an image of an object, and for outputting electrical image signals corresponding to the received image;
movement detection means, coupled to said image receiving means, for detecting relative movement between said camera apparatus and said object, and for outputting an output signal corresponding to the detected relative movement;
compensating means for compensating for a movement of the image received by said image receiving means corresponding to the relative movement of the image receiving means and the object on the basis of the output signal output by said movement detection means; and
control means for sampling the output signal of said movement detection means at a predetermined cycle, and for stopping at least a part of an operation of said camera apparatus in an abnormal state that a number of times in which the output of said movement detection means is outside of a predetermined range reaches a predetermined number of times within a predetermined amount of time.

15. A camera apparatus according to claim 14, wherein said movement detection means comprises a plurality of sensors capable of detecting movements in the vertical and horizontal directions.

16. A camera apparatus according to claim 14, wherein said control means turns off at least a part of a power supply of said camera apparatus when the number of times in which the output of said movement detection means is outside of a predetermined range within a predetermined amount of time reaches a predetermined number of times.

17. A camera apparatus according to claim 16, wherein said control means is adapted to turn off the power supply of a recording circuit of said camera apparatus when the detected movement is greater than a predetermined value.

18. A camera apparatus having a vibration-proof function, comprising:
a camera for photographing an object and recording an image of the object on a recording medium;
movement detection means, coupled to the camera, for detecting a relative movement between said camera and the object, and for outputting an output signal corresponding to the detected relative movement;
image blur compensating means for compensating an image blur corresponding to the detected relative movement on the basis of the output from said movement detection means;
driving means for driving the image blur compensating means;
discriminating means for monitoring an output signal from said movement detection means, and for discriminating that said camera is in a fixed state when a level of the output signal is below a predetermined level for a predetermined period of time; and
control means for computing an amount of a movement compensation on the basis of the output signal from said movement detection means in order to control said driving means to cause said image blur compensating means to compensate the image blur, and for stopping the driving of said driving means in the case that it is determined by said discriminating means that said camera is in a fixed state.

19. A camera apparatus according to claim 18, wherein said movement detection means includes a plurality of sensors for detecting movements in the vertical and horizontal directions.

20. A camera apparatus according to claim 18, wherein said image blur compensating means comprises a variable apical angle prism.

21. A camera apparatus according to claim 20, wherein said variable apical angle prism is adapted to be mounted front of a photographing optical system of said camera.

22. A camera apparatus according to claim 18, wherein said discrimination means determines that the camera is fixed when the output of said movement detection means is smaller than a predetermined level.

23. A camera apparatus according to claim 22, wherein said discrimination means determines that the camera is fixed when the output of said movement detection means is smaller than a predetermined level for a predetermined amount of time.

24. A camera apparatus according to claim 23, wherein said control means turns off a power supply of said driving means.

25. A camera apparatus having a vibration-proof function, comprising:
a camera for photographing an object and recording an image of the object on a recording medium;

movement detection means, coupled to said camera, for detecting a relative movement between said camera and the object, and for outputting an output signal according to the relative movement detected by said movement detection means;

image blur compensating means for compensating an image blur corresponding to the detected relative movement on the basis of the output signal output from said movement detection means;

driving means for driving the image blur compensating means;

discriminating means for discriminating that said camera is in a predetermined fixed state when a level of the output signal is below a predetermined level for a predetermined period of time; and control means for controlling said driving means to cause said image blur compensating means to compensate the image blur on the basis of the output signal output from said movement detection means, and for stopping said driving means in the case that it is determined by said discriminating means that said camera is in the predetermined fixed state.

26. A camera apparatus comprising:

a camera body;

movement detection means, disposed in said camera body, for detecting a relative movement between said camera body and an object, and for outputting an output signal according to the movement detected by said movement detection means; and control means for controlling a power supplying state of said camera body on the basis of an output signal output from said movement detection means so as to shift the power supplying state of said camera body to a low power supplying state in an abnormal state in which a period of time, in which the output signal of said movement detection means is outside of a predetermined range, substantially exceeds a predetermined period of time.

27. Apparatus according to claim 26, wherein said low power supplying state comprises a power-supply off state.

28. Apparatus according to claim 26, wherein said control means turns off a power supply to said camera apparatus when an amount of detected movement becomes greater than a predetermined value on the basis of the output of said movement detection means.

29. Apparatus according to claim 26, wherein said control means includes an abnormality detection circuit for monitoring the output of the movement detection means for a predetermined amount of time in order to detect an abnormality on the basis of a ratio of a time period in which the output of the movement detection means is greater than a predetermined value to a time period in which the output of the movement detection means is smaller than the predetermined value, and for outputting an abnormality signal indicating that recording is not needed.

30. Apparatus according to claim 29, wherein said control means turns off a power supply of said camera apparatus on the basis of said abnormality signal.

31. Apparatus according to claim 30, wherein said control means comprises a picture image recording means for recording photographed picture images, and wherein said control means releases a recording mode of said picture image recording means on the basis of said abnormality signal in such a mode to a recording standby mode.

32. A camera apparatus comprising:

a camera body;

image receiving means for receiving an image of an object, and for outputting electrical image signals corresponding to the received image;

movement detection means, coupled to said camera body, for detecting a relative movement between the camera body and the object, and for outputting an output signal according to the movement detected by said movement detection means; and control means for sampling the output signal of said movement detection means at a predetermined period of time, and for stopping at least a part of an operation of said camera apparatus in an abnormal state that a number of times in which the output of said movement detection means is outside of a predetermined range reaches a predetermined number of times within a predetermined period of time.

33. Apparatus according to claim 32, wherein said movement detection means comprises a plurality of sensors capable of detecting movements in the vertical and horizontal directions.

34. Apparatus according to claim 32, wherein said control means turns off at least a part of a power supply of said camera apparatus when the number of times in which the output of said movement detection means is outside of a predetermined range within a predetermined amount of time reaches a predetermined number of times.

35. Apparatus according to claim 32, wherein said control means is adapted to turn off the power supply of a recording circuit of said camera apparatus when the detected movement is greater than a predetermined value.

* * * * *

UNITED STATES PATENT AND TRADEMARK OFFICE
CERTIFICATE OF CORRECTION

PATENT NO. : 5,596,366
DATED : January 21, 1997
INVENTOR(S) : TSUNEO TAKASHIMA, ET AL.

It is certified that error appears in the above-indentified patent and that said Letters Patent is hereby corrected as shown below:

On the title page, item:

[56] References Cited:

FOREIGN PATENT DOCUMENTS

"63209070    2/1990    Japan" should read
--63-209070  2/1990    Japan--.

COLUMN 6:

Line 10, " "$\theta a|$" should read --$|\theta a|$--.

COLUMN 7:

Line 57, "coil drive," should read --coil drive--.

Signed and Sealed this

Twenty-fourth Day of June, 1997

Attest:

BRUCE LEHMAN

*Attesting Officer*    *Commissioner of Patents and Trademarks*